United States Patent
Kirschey

(10) Patent No.: US 7,497,782 B2
(45) Date of Patent: Mar. 3, 2009

(54) FLEXIBLE SHAFT COUPLING

(75) Inventor: Gerhard Kirschey, Wuppertal (DE)

(73) Assignee: Centa-Antriebe Kirschey GmbH, Haan (DE)

( * ) Notice: Subject to any disclaimer, the term of this patent is extended or adjusted under 35 U.S.C. 154(b) by 52 days.

(21) Appl. No.: 11/602,509

(22) Filed: Nov. 20, 2006

(65) Prior Publication Data

US 2007/0117638 A1 May 24, 2007

(30) Foreign Application Priority Data

Nov. 22, 2005 (DE) .................. 10 2005 055 605

(51) Int. Cl.
*F16D 3/00* (2006.01)

(52) U.S. Cl. ...................................... 464/88

(58) Field of Classification Search ............... 464/71, 464/72, 88, 82, 92, 93, 138
See application file for complete search history.

(56) References Cited

U.S. PATENT DOCUMENTS

| | | | |
|---|---|---|---|
| 4,929,115 A | 5/1990 | Lunke | |
| 5,514,038 A * | 5/1996 | Harpin | 464/93 |
| 5,545,090 A | 8/1996 | Kirschey | |
| 6,669,569 B2 | 12/2003 | Geislinger | |
| 6,953,399 B2 | 10/2005 | Kirschey | |
| 2001/0023206 A1 | 9/2001 | Kirschey | |
| 2001/0053717 A1 * | 12/2001 | Geislinger | 464/92 |

FOREIGN PATENT DOCUMENTS

| EP | 1 413 789 | 4/2004 |
|---|---|---|
| EP | 1413789 | 4/2004 |

* cited by examiner

*Primary Examiner*—Aaron M Dunwoody
(74) *Attorney, Agent, or Firm*—Andrew Wilford

(57) ABSTRACT

A coupling for transmitting torque between a driving element and a driven element, one of which is rotatable about an axis an formed with an annular array or mounting holes centered on the axis, has an elastomeric ring centered on the axis and having a dished face concave toward and directed axially at one of the elements and an opposite generally planar face directed axially at the other of the elements. Respective face plates conform and are vulcanized to the faces. Formations serve for connecting the face plate of the planar face directly to the other element. An annular and thin coupling disk centered on the axis has an outer periphery and an inner periphery and an inner face turned toward the elastomeric ring and an outer face turned away therefrom. Bolts secure the disk outer periphery directly to an outer edge of the face plate of the dished face.

9 Claims, 1 Drawing Sheet

FLEXIBLE SHAFT COUPLING

FIELD OF THE INVENTION

The present invention relates to a flexible coupling. More particularly this invention concerns an flexible shaft coupling serving to compensate for axial misalignments.

BACKGROUND OF THE INVENTION

A standard flexible shaft coupling for connecting an input element or drive, such as a flywheel of a diesel motor, with an output or driven element, such as a transmission or differential shaft hub, by means of at least one torsionally and radially flexible coupling element comprises a flexible annular body to whose opposite faces are vulcanized respective mounting face plates, one connected to the drive and the other to the output element. A bolt fastener secures the flexible shaft coupling to the driven element in an axially pluggable connection.

Flexible shaft couplings of this generic kind are known through public prior use by the applicant as well as from a catalog of the applicant (CENTAX® Flexible Couplings, identifier CX-B-2-90). They are also seen in U.S. Pat. Nos. 4,929,115, 5,545,090, and 6,953,399 and in EP 1,413,789. In the state of the art, the torsionally and radially flexible coupling element is annular and serves to transmit torque between the driven and the driving elements and also compensates for radial offset of the elements. Axial and angular misalignments, however, can only be compensated for to a limited degree by the rubber flexible annular body. In the state of the art, the rubber flexible ring is connected to the driven element by means of a bolt fastener, in order to provide axial compensation for axial misalignments and material extensions that are mainly caused by heat during operation. In addition to such axial displacements, the torsionally stiff bolt fastener to a very small degree also compensates for angular misalignments such that the combined assembly of rubber flexible ring and bolt fastener has sufficient reserves to compensate for angular offset between the driving and the driven elements which is seen in a plurality of applications.

In addition to the fact that the shaft coupling is almost universally applicable, it is also advantageously composed of individual elements which are comparatively simple as far as the technical aspects are concerned and cost-efficient in their production.

Still, it is considered that the above-mentioned, basically advantageous flexible shaft coupling can be further improved, particularly as far as the possible fields of application are concerned, since the tumbling movements caused by the angular offset can soften and thus damage the core of the rubber flexible annular body.

OBJECTS OF THE INVENTION

It is therefore an object of the present invention to provide an improved flexible shaft coupling.

Another object is the provision of such an improved flexible shaft coupling that overcomes the above-given disadvantages, in particular such that not only small but also moderate angular misalignments can be compensated for.

SUMMARY OF THE INVENTION

A flexible coupling for transmitting torque about an axis between a driving element and a driven element, one of which is rotatable about the axis and formed with an annular array or mounting holes centered on the axis, has according to the invention an elastomeric ring generally centered on the axis and having a dished face concave toward and directed axially at one of the elements and an opposite generally planar face directed axially at the other of the elements. Respective dished and planar face plates fit and are vulcanized to the faces. Formations (e.g. bolt holes) serve for connecting the face plate of the planar face directly to the other element. An annular and thin membrane or coupling disk centered on the axis has an outer periphery and an inner periphery and an inner face turned toward the elastomeric ring and an outer face turned away therefrom. Bolts secure the disk outer periphery directly to an outer edge of the face plate of the dished face. A stiffening ring bears axially on the disk inner periphery against the inner face thereof. Respective stems are axially shiftable in the flange holes of the one element and bear on the outer face of the disk at the inner periphery thereof. Respective bolts engage through the stems and into the stiffening ring so as to fix the stems to the disk and clamp the disk inner periphery between the stems and the stiffening ring.

Compared to the state of the art, the use of a membrane-type coupling disk between elastomeric ring and bolt fastener allows for compensation for moderate angular misalignments, since tumbling movements caused by angular offset are absorbed by the membrane-type coupling disk. Thus, the membrane-type coupling disk dampens the dynamic loads acting on the elastomeric ring while allowing the use of the otherwise advantageously simple and cost-efficient construction of the flexible shaft coupling. In particular, simple installation and removal of the coupling as well as the compensation for radial and axial element displacements are ensured thanks to the axially pluggable bolt fastener.

The stems that can slide in the flange of the one element, typically the driven element, ensure that the coupling disk can remain as planar as possible, since this way it is least likely to buckle and can transmit the maximum amount of torque. Furthermore these sliding stems allow the system to be retrofitted to an existing drive train, where inevitably occurring tolerance variations mean that the axial spacing, for instance, from the face of the engine flywheel to the input hub of the differential or transmission can vary somewhat, in particular because the engine is typically carried on rubber engine mounts.

The elastomeric or rubber ring and/or the face plates according to the invention can be made in one unitary piece or of several separate segments, for instance three 120° or two 180° pieces. This way, thanks to the flexible annular body composed of individual ring segments, very large ring bodies of radial and torsional flexibility for very large drive units, such as diesel motors for ships, can advantageously be produced and installed economically. Furthermore, the individual ring segments of the elastomeric ring can easily be radially removed for maintenance or exchange, such that the elements connected by means of the flexible shaft coupling do not have to be arranged at an axial spacing.

From the state of the art, a highly flexible coupling has become known, as shown for example in a product catalog. So-called CENTAX® Torsionally Soft Couplings, series S/E/D, identification CX-S/E/S-88 are provided with a nonsegmented annular construction and a spring steel membrane. Here the membrane is set at a spacing from the face plate on the output side of the elastomeric ring by means of a spacer sleeve and is fastened by threaded bolts on a shaft hub on the output side.

In the coupling, the spring-steel membrane compensates for very large angular misalignments and axial displacements. A steel membrane is required that has the properties of spring steel due to hardening procedures and surface treatments and consequently is complex and expensive in production, in order to damp the existent dynamic forces. The spacing from the mounting face plate which ensures a necessary space of interaction for the spring steel membrane furthermore enlarges the space required for the installation of such a coupling. Depending on the size of the coupling and particularly on whether high torque has to be transmitted, several spring steel membranes need to be provided in series, since one single spring steel membrane of corresponding thickness does not have the sufficient flexibility. In order to avoid friction between the spring steel membranes, they have to be set at a spacing from each other or a complex insulation must be provided between the individual membranes.

It is normally considered impossible to make membrane-type couplings so they can be plugged in. A large angular offset between the elements leads to a very accentuated tumbling movement of the spring steel membrane and this movement would be transmitted to the bolts of a bolt fastener. Therefore, a constant relative movement of the bolts of a bolt fastener in the corresponding holes on the output side would be take place so that a bolt fastener used in that way would be quickly worn out.

Consequently, the use of a spring steel membrane for the compensation for angular misalignments between the driven element and the driving element is only recommended in cases when a corresponding flexibility is imperatively required, when the increased constructive and economic efforts are justified and when disadvantages such as lacking axial pluggability on the membrane side can be accepted.

With the plug-in bolt stems according to the invention it is therefore relatively easy to make a membrane-type coupling that can still be installed quickly and easily, yet will have a relatively long service life because the individual bolts can shift in the flange and are fixed to a stiffening ring that prevents them from working through the membrane disk.

In the inventive flexible shaft coupling, it is advantageous to arrange the bolts of the bolt fastener in proximity to the inner periphery of the angularly flexible annular disk, a large surface of the annular disk is therefore available for the absorption of the tumbling movement caused by angular misalignments so that between the mounts of the bolt fastener at the inner periphery and the mounts at the outer periphery on the mounting face plate there is quite a bit of the membrane disk available to deform.

It is advantageous if the bolts of the bolt fastener engage into the mounting bore holes of the membrane-type coupling disk in a tight form-fitting manner and through it to the stiffening ring that transmits torque that has to be transmitted from the drive to the output.

Between the annular disk and the mounting face plate at least one thrust bearing designed as a stiffening ring with flat profile is arranged, into which bearing the mounting screws of the bolt fastener, reaching through the annular disk, are engaged.

If in flexible shaft couplings the mounting face plate is recessed on its side toward the drive and the recessed mounting face plate and the angularly flexible annular disk form an annular collar, into which the stiffening ring of flat profile designed as thrust bearing is arranged, the axial installation space for the inventive shaft coupling can be further reduced. At the same time, the annular chamber formed on the dished side allows for movement for the absorption of the tumbling movement of the membrane-type coupling disk.

The inventive annular disk is made of metal, particularly of sheet steel that is preferably untempered and does not have treated surfaces. It is substantially thicker than a typical membrane disk such as described in above-cited EP '789. The disk according to the invention is sufficient for the intended application of the coupling if it is dimensioned such that it allows a maximal angle offset of about 0.5°. The other parts of the flexible shaft coupling according to the invention provide all the compensation needed.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
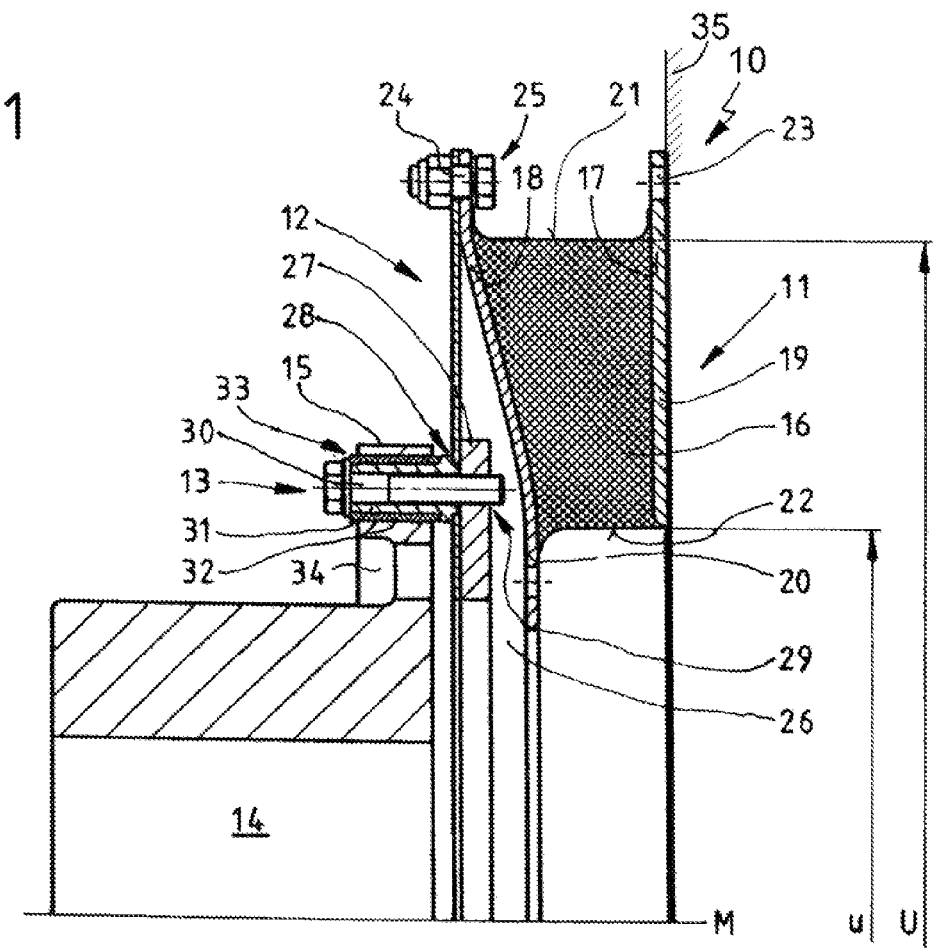
FIG. 1 is an axial section through part of an inventive flexible shaft coupling with a flanged output hub.

As seen in FIG. 1 a flexible shaft coupling generally indicated at 10 has three main subassemblies or parts, namely a torsionally and radially flexible coupling element 11, a membrane-type coupling disk 12 and a bolt fastener 13.

The shaft coupling 10 connects a driving element here indicated schematically as a flywheel 35 of a diesel engine with a driven element here shown as a shaft hub 14 with a hub flange 15 and centered on an axis M. The coupling element 11 in the illustrated embodiment consists of a rubber ring 16. A planar drive-side face 17 and an opposite driven-side face 18 of the ring 16 are flatly vulcanized to respective mounting face plates 19 and 20.

The mounting face plate 19 serves to connect the shaft coupling 10 to the flywheel 35 of a diesel motor. The membrane-type coupling disk 12 and the bolt fastener 13 are connected with the coupling element 11 via the mounting face plate 20 on the output side. The rubber flexible annular ring 16 has parallel outer and inner cylindrical peripheries 21 and 22 respectively of diameters U and u. The annular-shaped rubber ring 16, however, conically broadens from its inner periphery u to its outer periphery on one side—in the present case on the output side. This generally known geometry ensures that the same shearing stress conditions are maintained over the whole profile of the rubber ring 16. The coupling element 11, consisting of the annular-shaped rubber element 16 and the mounting face plates 19 and 20 is distributed by the applicant as so-called "Centax Element" as an integral component for a number of shaft couplings.

The mounting face plates 19 and 20 of the Centax element 11 are provided with a plurality of axially aligned mounting bore holes 23 and 24 arranged on the outer periphery. The mounting bore holes 23 serve for mounting of the shaft coupling on the drive side. The annular disk 12 has bore-holes axially aligned with the mounting bores 24 so that the coupling element 11 and the annular disk 12 can be fastened to each other by means of bolt or screw assemblies 25. Following the conical form of the side surface 18 of the Centax element 11, the mounting face plate 20 is recessed centrally on the output side, so that an annular chamber 26 is formed between the mounting face plate 20 and the annular disk 12. Within the annular chamber 26 a stiffening ring 27 formed like a thrust bearing is arranged in the area of the inner periphery of the annular membrane disk 12. The stiffening ring 27 is provided with threaded bores 29 aligned axially with mounting bores or holes 28 on the inner periphery of the annular membrane disk 12.

The bolt fastener 13 is formed by the mounting screws 30 extending through tubular steel stems 31 that are covered by flexible rubber or plastic sleeves 32. The subassembly of mounting screws 30, stems 31 and rubber sleeves 32 is arranged on the output side at the inner periphery of the annular disk 12. The stems 31 of the bolt fastener 13 engage in the mounting bore holes 28 of the membrane-type coupling disk 12 in a tight form-fitting manner so that the torque or tangential force of the drive is transferred from the annular disk 12 to the stems 31 of the bolt fastener 13. The mounting screws 30 that extend through the annular disk 12 at the output side are screwed directly into the threaded bore holes 29 of the stiffening ring 27 in order to fasten the stems 31 to the annular disk 12. This way, the stiffening ring 27 not only serves as thrust bearing for the stems 31 and for the purpose of mounting the screws, but also reinforces and stiffens the inner periphery of the angularly flexible annular disk 12 where it is joined to the stems 31 and thus helps, in combination with the initial tension of the mounting screws 30, to prevent the stems 31 from tilting and/or tearing out as a consequence of the applied tangential force or as a consequence of a tumbling movement caused by an offset angle between the rotation axes of the input or drive element 35 and the output or driven element 14. The movements are dampened by the flexibly yielding surface of the membrane-type coupling disk 12 situated on the outer periphery between the stiffening ring 27 and the screw connections 25.

The hub flange 15 is provided with seats or holes 33 aligned with the stems 31 of the bolt fastener 13, which holes form a bearing for the stems 31. In combination with the rubber sleeves 32, the reception holes 33 form an axially moveable slide bearing. In FIG. 1, ventilation openings 34 are arranged at the threaded flange underneath the holes 33 for the stems 31 of the bolt fastener 13. During operation of the shaft coupling 10, the coupling element 11 dampens torque fluctuations due to its torsionally flexibility and is capable of compensating for a radial offset of the output diverging from the axis M. Furthermore, the Centax element 11 is capable of compensating for a small offset angle.

The annular disk 12 has a membrane-like design, that means in particular that it is made of steel and produced in the same way as spring-steel membranes known in the state of the art cited before. Its steel is, however, preferably untempered sheet steel whose surface was not subjected to surface treatments, such as grinding. Furthermore, the annular disk 12 has increased material strength compared to a spring steel membrane which is designed for a maximum of axial and functional flexibility. Preferably, the membrane-type coupling disk 12 is of such dimensions that only an offset angle of maximally about 0.5° can be compensated for by it, further flexibility is provided by the other elements of the coupling 10, in particular the rubber ring 12.

The Centax element 11 and the annular disk 12 are mounted on the driven element such that they can be axially plugged in and axially moved by means of a bolt fastener 13 fastened on the annular ring 12. The bolt fastener 13 serves for compensation for axial misalignments of the elements and axial extensions of the elements, particularly of the shafts which misalignments or extensions are caused, for example, by thermal effects.

Figure 2:
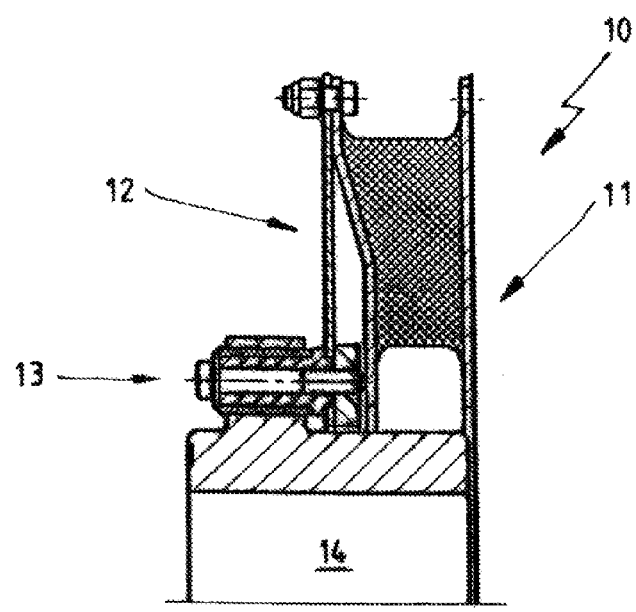
FIG. 2 is a similar section of a modification of the coupling.

FIG. 2 shows a flexible shaft coupling 10 with shaft hub 14 alternatively flanged thereto. By means of the shaft hub 14, partially arranged within the Centax element 11, the axial installation space for the shaft coupling 10 can be further reduced. Since in the case of coupling elements 11 made of one piece a radial exchange of the coupling element 11 is not possible in the assembly illustrated in FIG. 2, this embodiment is used for the reduction of the axial installation space, particularly in flexible shaft couplings 10, the coupling element 11 of which is composed of several, circumferentially spaced ring segments.

Compared to the state of the art, the inventive flexible shaft coupling 10, thanks to the use of the membrane-type coupling disk 12, has a comparatively high angular compensation capacity that results from the small angle tolerances of the coupling element 11 and of the bolt fastener 13 as well as from the angle tolerance of at most 0.5° of the membrane-type coupling disk 12. Thus, a flexible shaft coupling 10 is created whose angular compensation quality is absolutely sufficient, (except for special application purposes) without having to include expensive elements, such as a spring steel membrane.

By means of the arrangement of the thrust bearing 27 within the recessed area of the face plate 20 on the output side, an extremely space-saving design of the inventive coupling can be achieved in combination with the bolt fastener 13 in axial direction, so that the coupling can also be used in elements which are situated close to each other. Subsequent to the removal of the bolt fastener 13 and of the membrane-type coupling disk 12, the flexible coupling 10 can also be radially exchanged without having to move the elements when a non segmented embodiment is chosen, thanks to the recessed face plate 20 on the output side.

I claim:

1. A flexible coupling for transmitting torque about an axis between a driving element and a driven element, one of the elements being rotatable about the axis and formed with an annular array of flange holes centered on the axis, the coupling comprising:
    an elastomeric ring generally centered on the axis and having a dished face concave toward and directed axially at the one of the elements and an opposite generally planar face directed axially at the other of the elements;
    respective planar and dished face plates conforming to and vulcanized to the faces;
    formations connecting the planar face plate directly to the other element;
    an annular and thin membrane disk centered on the axis and having an outer periphery and an inner periphery and an inner face turned toward the elastomeric ring and an outer face turned away therefrom and toward the one element;
    bolts securing the disk outer periphery directly to an outer edge of the dished face plate;
    a stiffening ring bearing axially on the disk inner periphery against the inner face thereof;
    respective stems axially shiftable in the flange holes of the one element and bearing on the outer face of the disk at the inner periphery thereof; and
    respective stem bolts engaged through the stems and in the stiffening ring so as to fix the stems to the disk and clamp the disk inner periphery between the stems and the stiffening ring.

2. The coupling defined in claim 1, further comprising
    respective flexible sleeves surrounding the stems and engaged between the stems and the flange holes.

3. The coupling defined in claim 1 wherein the elastomeric ring is of increasing axial thickness outward from the axis.

4. The coupling defined in claim 1 wherein the face plates are rigid and relatively thick and the disk is flexible and relatively thin.

5. The coupling defined in claim 1 wherein the face plates are annular with circular inner and outer peripheries.

6. The coupling defined in claim 1 wherein the membrane disk is stiff and itself only permits an axial offset of at most 0.5°.

7. The coupling defined in claim 1 wherein the membrane disk has untreated and unhardened faces.

8. The coupling defined in claim 1 wherein the membrane disk is of unhardened sheet steel.

9. The coupling defined in claim 1 wherein the stiffening ring is of generally rectangular section and is formed with an array of threaded holes each receiving a respective one of the stem bolts.

* * * * *